(12) United States Patent
Edakara et al.

(10) Patent No.: US 8,303,780 B2
(45) Date of Patent: Nov. 6, 2012

(54) METHOD OF FORMING MASK FOR DRY ETCHING AND MANUFACTURING METHOD OF MAGNETIC HEAD USING THE SAME METHOD

(75) Inventors: Kento Edakara, Tokyo (JP); Hiromichi Umehara, Tokyo (JP); Noriaki Kasahara, Tokyo (JP); Michitaka Nishiyama, Tokyo (JP)

(73) Assignee: TDK Corporation, Tokyo (JP)

( * ) Notice: Subject to any disclaimer, the term of this patent is extended or adjusted under 35 U.S.C. 154(b) by 749 days.

(21) Appl. No.: 12/241,667

(22) Filed: Sep. 30, 2008

(65) Prior Publication Data

US 2010/0078316 A1    Apr. 1, 2010

(51) Int. Cl.
*C23C 14/00* (2006.01)
*C23C 14/32* (2006.01)
(52) U.S. Cl. .............................. 204/192.34; 204/192.15
(58) Field of Classification Search ............. 204/192.34, 204/192.15
See application file for complete search history.

(56) References Cited

U.S. PATENT DOCUMENTS

| 4,777,074 | A | * | 10/1988 | Wada et al. | 428/156 |
| 5,607,599 | A | * | 3/1997 | Ichihara et al. | 216/22 |
| 5,994,756 | A | * | 11/1999 | Umezawa et al. | 257/510 |
| 2005/0213239 | A1 | * | 9/2005 | Hibi et al. | 360/48 |
| 2006/0238918 | A1 | | 10/2006 | Kato et al. | |

FOREIGN PATENT DOCUMENTS

| JP | 5-67604 | 3/1993 |
| JP | 2003-203311 | 7/2003 |
| JP | 2003-263705 | 9/2003 |
| JP | 2006-114076 | 4/2006 |

* cited by examiner

*Primary Examiner* — Luan Van
*Assistant Examiner* — Ibrahime A Abraham
(74) *Attorney, Agent, or Firm* — Oblon, Spivak, McClelland, Maier, & Neustadt, L.L.P.

(57) ABSTRACT

The present invention relates to a method for forming a dry etching mask. A plurality of aluminum oxide films are sequentially sputtered on a material to be dry etched in such a manner that etching rate with respect to reactive ion etching increases toward a lower layer. On a laminated film of the plurality of aluminum oxide films, there is formed a first mask that has etching resistance with respect to the reactive ion etching. Reactive ion etching is performed from above the first mask to form a second mask of the laminated film.

13 Claims, 13 Drawing Sheets

METHOD OF FORMING MASK FOR DRY ETCHING AND MANUFACTURING METHOD OF MAGNETIC HEAD USING THE SAME METHOD

TECHNICAL FIELD

The present invention relates to a method of forming a mask for dry etching and a manufacturing method of a magnetic head using the same.

BACKGROUND OF THE INVENTION

In the field of magnetic heads to be mounted on a magnetic recording device such as a hard disk drive (HDD), recently, perpendicular recording method has become a predominant recording method in order to improve recording density with respect to a magnetic recording medium such as a hard disk. The perpendicular recording method provides not only a high linear recording density but also an advantage that the recording medium after recording is less influenced by thermal fluctuation.

In order to improve the recording capacity of a hard disk drive (HDD), however, it is required not only to improve the recording resolution by increasing the coercive force of a medium but also to increase the track density by narrowing the width of a perpendicular writing main magnetic pole film of a perpendicular recording magnetic head. Since the width of the main magnetic pole film is decreased with an increase in the recording density, when increasing the recording density, it is extremely important to control the width of the main magnetic pole film as accurately as possible from the viewpoint of increasing the yield of the magnetic head.

For instance, the technique as disclosed in US2006/0238918A1 has been widely known as a method for forming the main magnetic pole film. This prior art document discloses a technique that an inorganic insulating layer is formed on a magnetic layer, a resist mask material is formed on the inorganic insulating layer, and ion milling is performed in this state to obtain a main magnetic pole of an inverted trapezoidal shape.

In this prior art, since the resist mask material defines the trailing side width (track width) of the main magnetic pole, the width of the mask material has to be accurately transferred to the trailing side width (track width) of the main magnetic pole. However, since the inorganic insulating layer lies between the resist mask material and the magnetic layer that will be formed into the main magnetic pole, the width of the resist mask material is firstly transferred to the inorganic insulating layer and the width of the inorganic insulating layer is then reflected on the magnetic layer that will be formed into the main magnetic pole, so that it is difficult to accurately transfer the width of the resist mask material to the trailing side width (track width) of the main magnetic pole. Particularly when the inorganic insulating layer is thick, the mask formed of the inorganic insulating layer by ion milling has a dominantly trapezoidal shape with almost the same width as the resist mask material at its top side in contact with the resist mask material but with an increased width at its bottom side in contact with the magnetic layer. Accordingly, it is difficult to accurately transfer the width of the resist mask material to the trailing side width (track width) of the main magnetic pole.

Since the above-described problem occurs when disposing a mask of an inorganic insulating material on a material to be dry etched, disposing a resist mask material on the mask for dimensioning the planar area of the material to be dry etched, and then performing milling, it does not pertain only to the perpendicular recording magnetic head. Also in integrated circuits and other electronic component elements, it cannot be avoided as long as adopting the above-mentioned mask structure for milling.

SUMMARY OF THE INVENTION

It is an object of the present invention to provide a method for forming a dry etching mask, in which a plane pattern of a resist mask material can be transferred to a material to be dry etched with high accuracy, and a method for manufacturing a magnetic head using the same.

In order to achieve the above object, a method for forming a dry etching mask according to the present invention comprises:

sequentially sputtering a plurality of aluminum oxide films on a material to be dry etched in such a manner that etching rate with respect to reactive ion etching (hereinafter referred to as RIE) increases toward a lower layer;

forming, on a laminated film of the plurality of aluminum oxide films ($Al_2O_3$), a first mask that has etching resistance with respect to the RIE; and performing RIE from above the first mask to form a second mask of the laminated film.

The laminated film, on which the first mask is formed, is etched by RIE, thereby forming the second mask.

Heretofore, since the whole laminated film (i.e., over the entire film thickness) is formed under a constant sputtering condition, the laminated film is etched with a constant etching rate. Therefore, the etching amount increases toward an upper layer that will be etched for a longer time, whereby the sectional profile of the second mask becomes a trapezoidal shape with a larger width at its bottom side. As a result, when the material to be dry etched is dry etched using the second mask, there is a problem that the enlarged bottom width of the second mask is transferred to the material to be dry etched, resulting in being larger than the width of the first mask which is originally intended to be transferred.

In order to solve this problem, the method for forming a dry etching mask according to the present invention includes sequentially sputtering a plurality of aluminum oxide films on a material to be dry etched in such a manner that etching rate with respect to RIE increases toward a lower layer. When RIE is performed on the laminated film from above the first mask to form a second mask of the laminated film, the etching amount during a single RIE process increases toward a lower aluminum oxide layer. Therefore, the width of the second mask at its bottom side in contact with the material to be dry etched comes close to the width at its top side in contact with the first mask, whereby the lateral sides at both sides of the bottom side rise almost perpendicularly from the bottom side. As a result, when the material to be dry etched is dry etched using the second mask, the material to be dry etched can be accurately set to almost the same size as the width of the first mask.

Formation of a plurality of aluminum oxide films with different etching rates can be achieved by controlling bias voltage upon the sputtering film formation. The etching rate increases with increasing the bias voltage but decreases with decreasing the bias voltage.

One typical application of the method for forming a dry etching mask according to the present invention is to a method for manufacturing a magnetic head with a main magnetic pole for perpendicular writing. In this application, after formation of a ferromagnetic film for the main magnetic pole, a plurality of aluminum oxide films are sequentially sputtered on the ferromagnetic film in such a manner that etching rate with respect to RIE increases toward a lower layer. Then, a first mask that has etching resistance with respect to the RIE is formed on a laminated film of the plurality of aluminum oxide films. Then, RIE is performed from above the first mask to form a second mask of the laminated film, and subsequently, dry etching is performed on the ferromagnetic film from above the second mask.

According to the manufacturing method, there can be realized a magnetic head with a main magnetic pole of a high-precision minute track width for writing.

The other objects, constructions and advantages of the present invention will be further detailed below with reference to the attached drawings. However, the attached drawings show only illustrative examples.

DESCRIPTION OF THE PREFERRED EMBODIMENTS

Method for Forming a Dry Etching Mask

Figure 1:
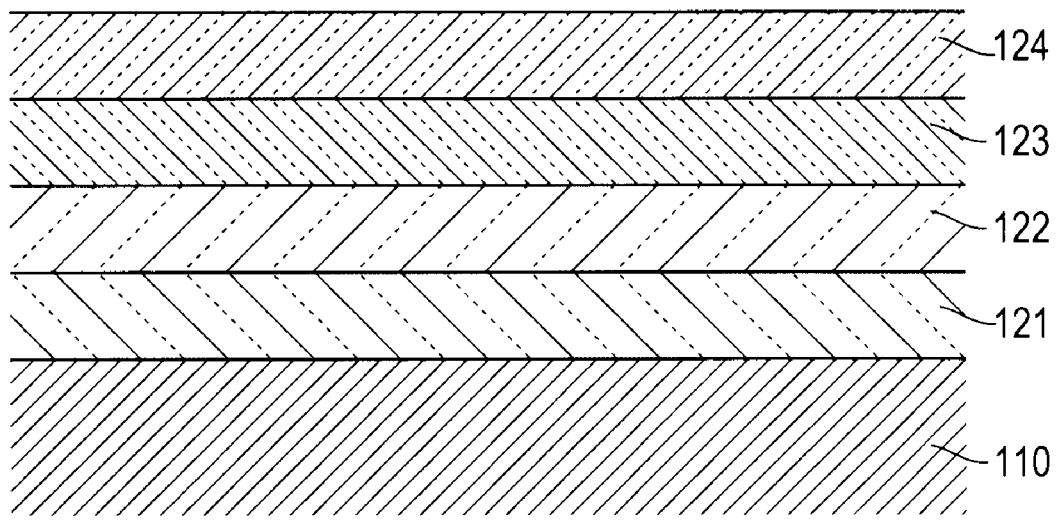
FIG. 1 is a diagram showing a step included in a method for forming a dry etching mask according to the present invention.

Referring to FIG. 1, a method for forming a dry etching mask according to the present invention includes sequentially sputtering a plurality "n" of aluminum oxide films 121 to 124 on a material 110 to be dry etched in such a manner that etching rate ER1 to ER4 with respect to RIE increases toward a lower layer. More specifically, the etching rate ER1 of the aluminum oxide film 121, the etching rate ER2 of the aluminum oxide film 122, the etching rate ER3 of the aluminum oxide film 123, and the etching rate ER4 of the aluminum oxide film 124 satisfy ER1>ER2>ER3>ER4. The layer number "n" of the aluminum oxide films 121 to 124 may be arbitrary. The individual film thicknesses of the aluminum oxide films 121 to 124 fall within the range of 150 to 250 nm, for example.

Figure 2:
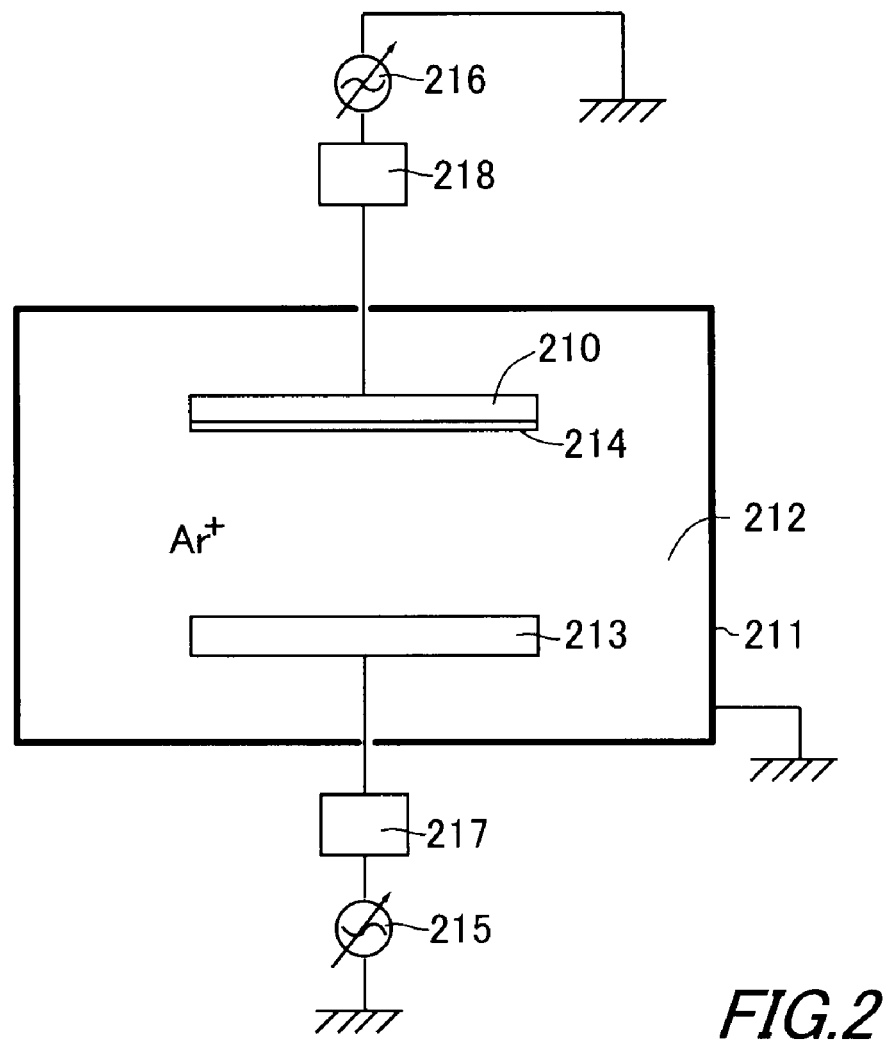
FIG. 2 is a diagram showing a configuration of a common sputtering system.

For the sputtering film formation, there is adopted a well-known sputtering system with a bias system. For example, as shown in FIG. 2, a target 231 made of aluminum oxide and a substrate 210 are disposed in an opposing manner in an interior space 212 of a vacuum chamber 211, and a voltage is applied between the target 213 and the substrate 210. To the target 213, a voltage is applied using an RF power 215 and a matching circuit 217; to the substrate 210, a bias voltage is applied using a voltage-controlled RF power 216 and a matching circuit 218. On the substrate 210, there is placed a material 214 to be dry etched. Typically, the material 214 to be dry etched is a wafer.

The interior space 212 of the vacuum chamber 211 is filled with Ar+, wherein when a voltage is applied between the substrate 210 and the aluminum oxide film target 213, electron and Ar+ move at high speed and Ar+ collides with the target 213. When colliding with the target 213, Ar+ sputters particles of the target 213. The sputtered aluminum oxide particles collide with and adhere to the material 214 to be dry etched, which is placed on the substrate 210, thereby forming the aluminum oxide films 121 to 124.

Figure 3:
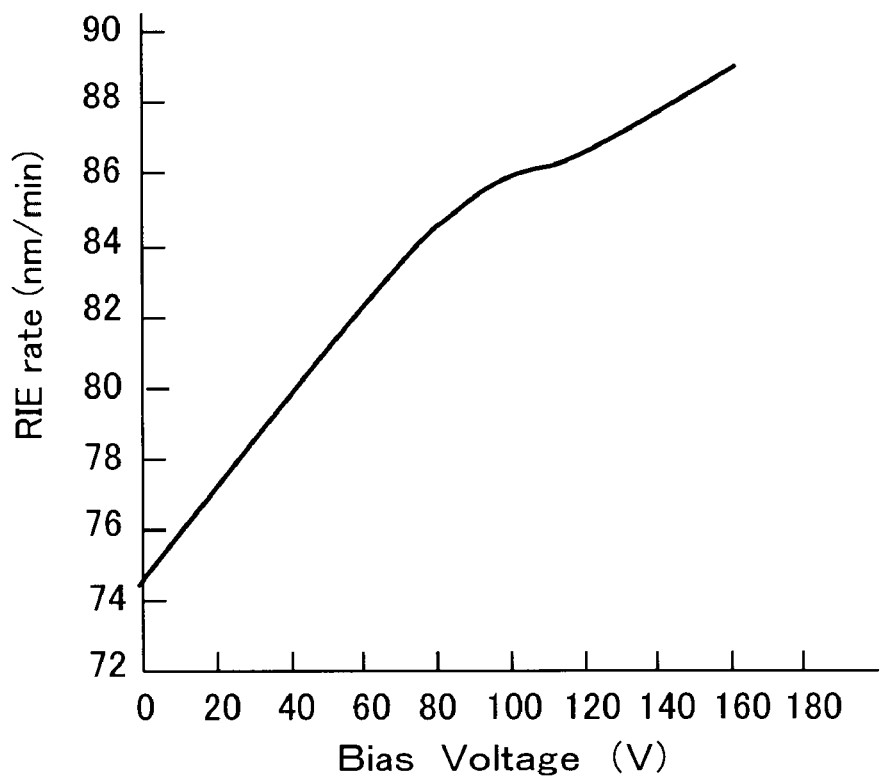
FIG. 3 is a graph showing a relationship between sputtering bias voltage and RIE rate.

The sputtering film formation of the plurality of aluminum oxide films 121 to 124 with different etching rates with respect to RIE can be achieved by controlling the bias voltage at each of the aluminum oxide films 121 to 124 in a stepwise fashion with the voltage-controlled RF power 216 being adjusted upon the sputtering film formation. The etching rate increases with increasing the bias voltage but decreases with decreasing the bias voltage. For example, as shown in FIG. 3, when the bias voltage is varied within the range of 20 to 180V, the RIE rate varies within the range of about 74 to 88.5 (nm/min).

In the present invention, since the aluminum oxide films 121 to 124 are sequentially sputtered in such a manner that the etching rate ER1 to ER4 with respect to RIE increases toward a lower layer, the bias voltage should increase toward a lower layer of the aluminum oxide films 121 to 124.

Figure 4:
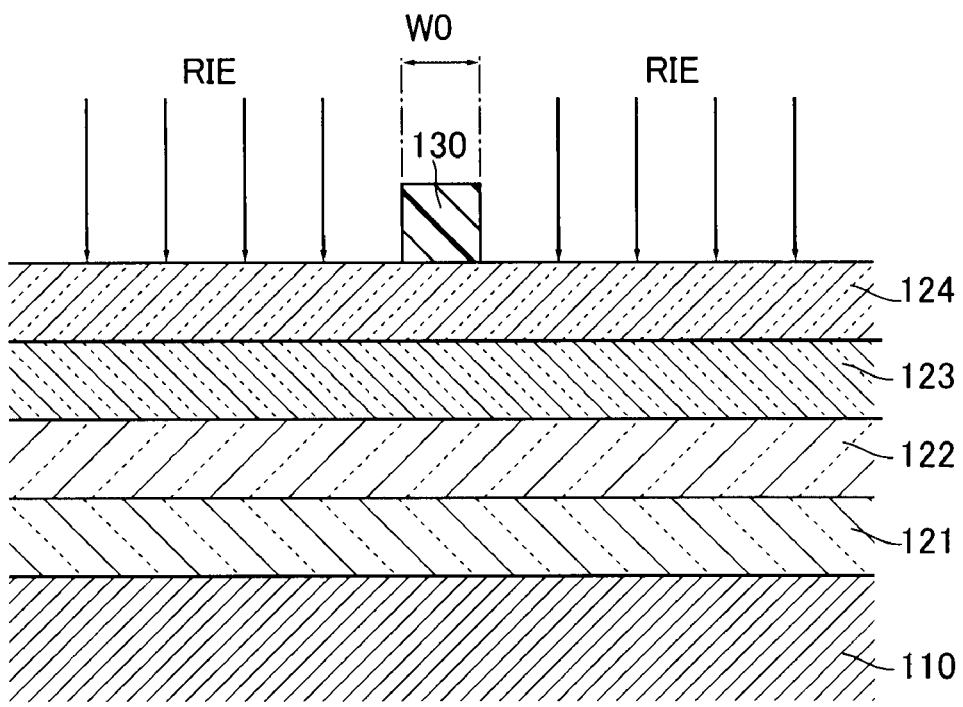
FIG. 4 is a diagram showing a step after the step shown in FIG. 1.

After the aluminum oxide films 121 to 124 are formed as described above, a first mask 130 that has etching resistance with respect to RIE is formed on the laminated film of the aluminum oxide films 121 to 124, as shown in FIG. 4. The first mask 130 can be produced by performing a photolithography process after a photoresist film that has etching resistance with respect to RIE is formed on the laminated film. The first mask 130 is to define a pattern required for a material to be dry etched. Since this pattern has two dimensions—width and length (depth), the pattern of the first mask 130 has to be considered as having two dimensions, but of which the width will be mainly discussed for the sake of simplifying the explanation.

The first mask 130 is formed to have a width W0 in conformity with the width required for the material 110 to be dry etched. Since the first mask 130 is obtained by patterning the photoresist by a photolithography process, it can be formed with an extremely high-precision pattern. In addition, since it is a resist mask, sufficient etching resistance can be ensured against an RIE process which features selective etching of the aluminum oxide films 121 to 124.

Figure 5:
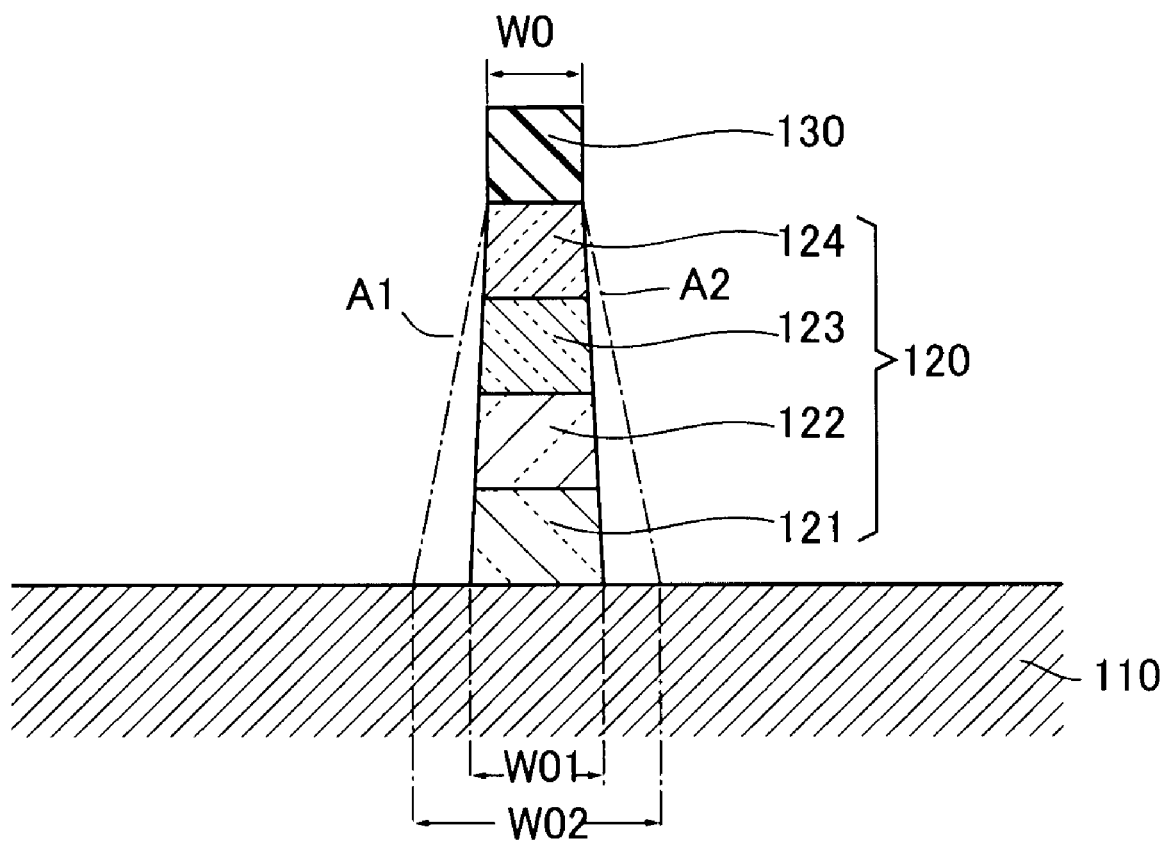
FIG. 5 is a diagram showing a step after the step shown in FIG. 4.

Then, RIE is performed from above the first mask 130 to form a second mask 120 out of the laminated film of the aluminum oxide films 121 to 124, as shown in FIG. 5. RIE is one of the microfabrication technologies classified as dry etching. Basically, an etching gas is turned into plasma within a reaction chamber by applying electromagnetic wave, and at the same time, high frequency wave is applied to a cathode on which a sample is to be placed. Then, a self-bias potential is generated between the sample and the plasma, accelerating ionic species and radicals of the plasma toward the sample for collision. At this time, sputtering due to the ion and chemical reaction of the etching gas occur simultaneously, achieving etching with high accuracy suitable for microfabrication.

In the meantime, the laminated film 120, on which the first mask 130 is formed, is etched by RIE, thereby forming the second mask 120.

Heretofore, since the whole laminated film 120 (i.e., over the entire film thickness) is formed under a constant sputtering condition, the laminated film 120 is etched with a constant etching rate. Therefore, the etching amount increases toward an upper layer that will be etched for a longer time, whereby the sectional profile of the second mask 120 becomes a trapezoidal shape as shown by dashed-dotted lines A1, A2 in FIG. 5. As a result, when the material 110 to be dry etched is dry etched using the second mask 120, the enlarged bottom width W02 of the second mask 120 is transferred to the material 110 to be dry etched, whereby the width W02 of the material 110 to be dry etched becomes considerably larger than the width W0 of the first mask 130 which is originally intended to be transferred.

Figure 6:
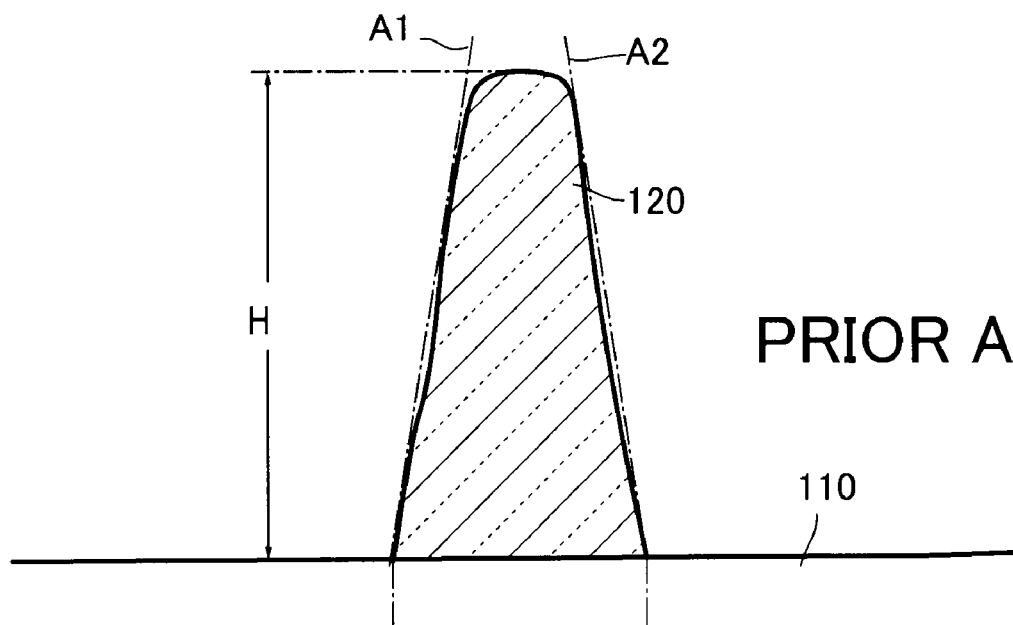
FIG. 6 is a diagram showing a profile of a dry etching mask obtained according to a conventional method.

This can be clearly seen from FIG. 6. FIG. 6 is obtained by tracing a SEM image of the second mask 120 obtained by RIE processing an aluminum oxide film formed under a constant sputtering condition (without bias). The second mask 120 was of a trapezoidal shape with a height H of 600 nm and a bottom width W02 of about 300 nm.

In the method for forming a dry etching mask according to the present invention, the aluminum oxide films 121 to 124 are sequentially sputtered on the material 110 to be dry etched in such a manner that the etching rate ER1 to ER4 with respect to RIE increases toward a lower layer. More specifically, as described above, sputtering is performed such that ER1>ER2>ER3>ER4.

When RIE is performed on the laminated film 120 from above the first mask 130, the etching rate increases toward a lower layer of the aluminum oxide films 121 to 124 during a single RIE process. Therefore, the width W01 (<W02) of the second mask 120 at its bottom side in contact with the material 110 to be dry etched comes close to the width W0 at its top side in contact with the first mask 130, whereby the side walls at both sides of the bottom side rise almost perpendicularly from the bottom side.

Figure 7:
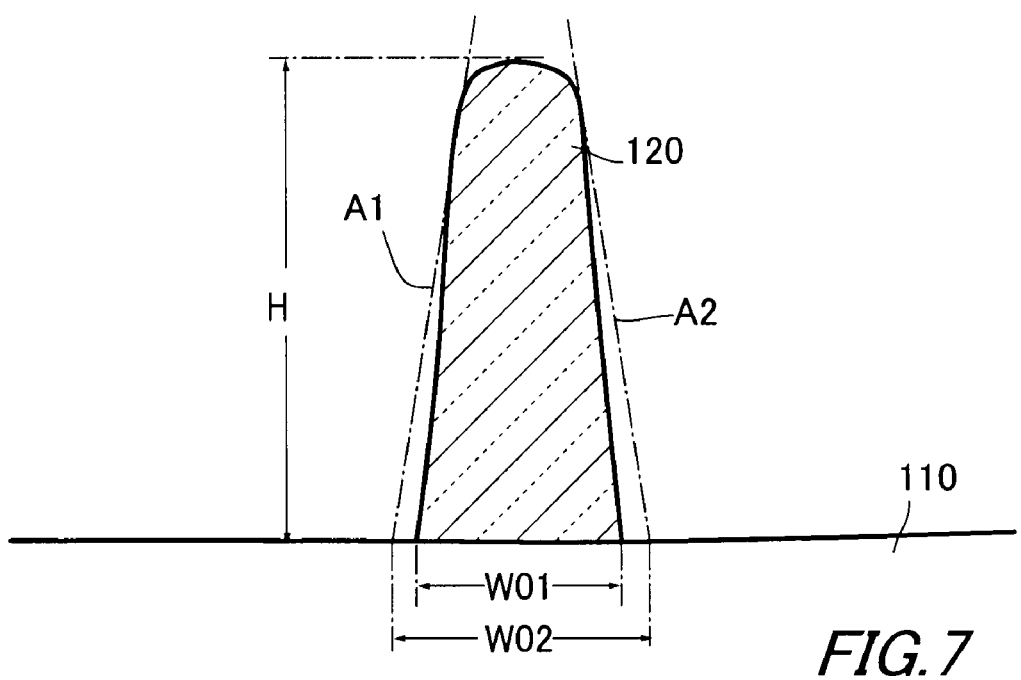
FIG. 7 is a diagram showing a profile of a mask obtained by adopting a method for forming a dry etching mask according to the present invention.

This can be clearly seen from FIG. 7. FIG. 7 is obtained by tracing a SEM image of the second mask 120 obtained by RIE processing three layers of aluminum oxide films formed by sputtering with different bias voltages.

Of the three layers of the aluminum oxide films, the lowermost aluminum oxide film was a film sputtered under a bias voltage of 160 V to have a thickness of 200 nm. The intermediate layer was a film sputtered under a bias voltage of 80 V to have a thickness of 200 nm. The uppermost aluminum oxide film was a film sputtered without bias voltage to have a thickness of 200 nm. Referring to FIG. 7, the width W01 of the second mask 120 at its bottom side in contact with the material 110 to be dry etched becomes considerably smaller than the width W02 of the prior art shown in FIG. 6, whereby the rising angle of the lateral sides at both sides of the bottom side approaches a right angle.

Figure 8:
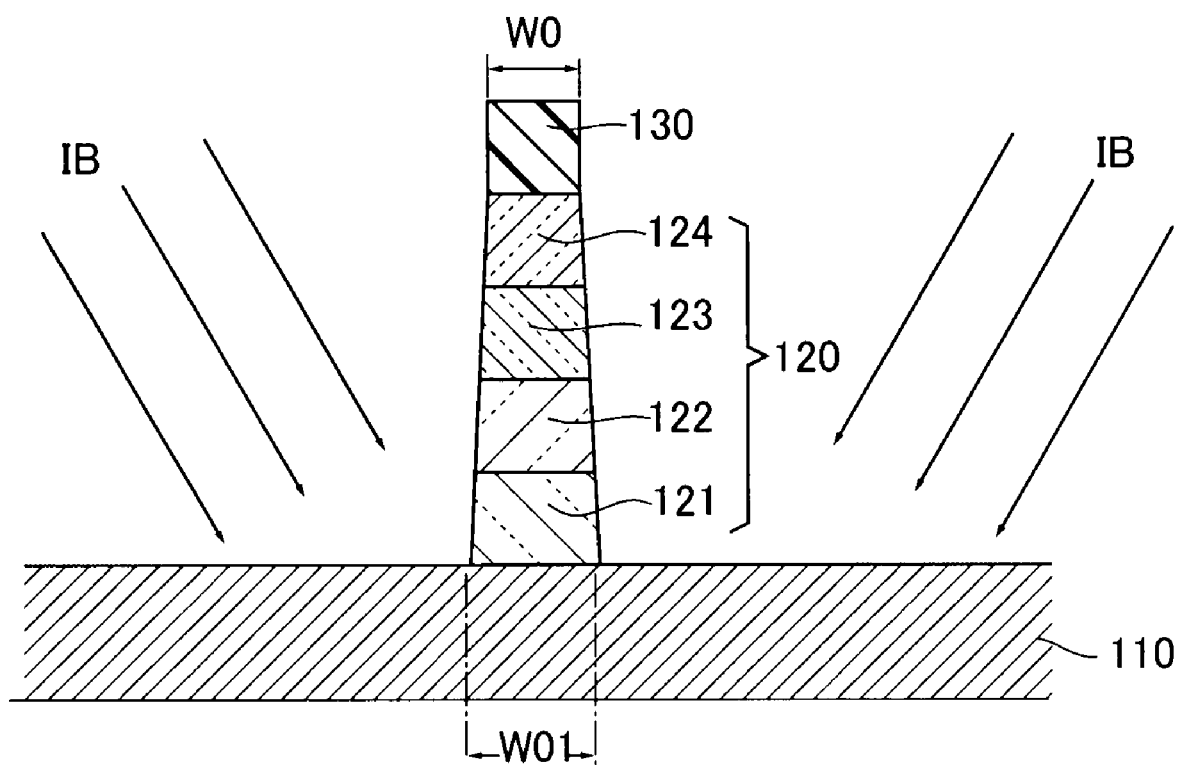
FIG. 8 is a diagram showing a step adopted after the step shown in FIG. 5.
Figure 9:
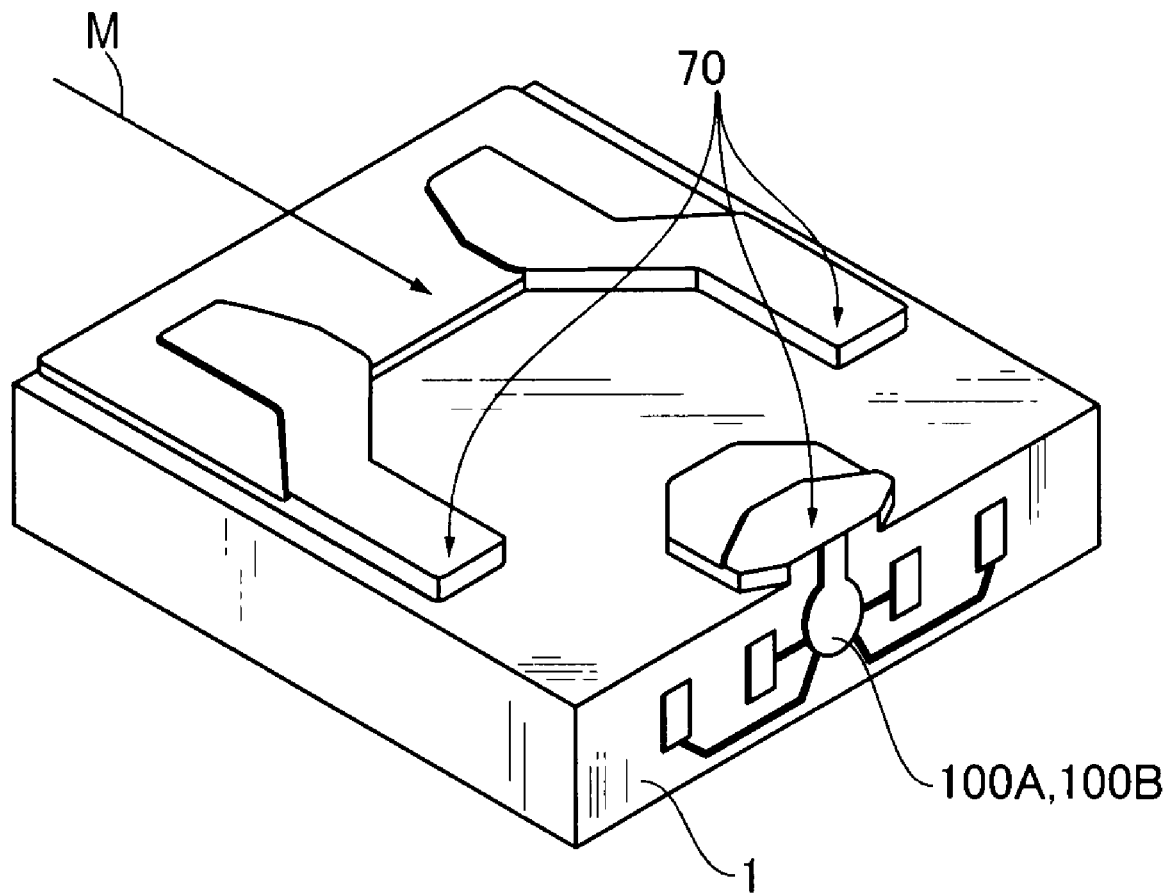
FIG. 9 is a perspective view of a magnetic head to which the dry etching mask forming method is applicable.

The second mask 120 thus obtained is used as a mask for dry etching the material 110 to be dry etched, as shown in FIG. 8. For dry etching, it is common practice to adopt ion milling using ion beams IB. In the second mask 120 according to the present invention, since the rising angle of the lateral sides at both sides of the bottom side approaches a right angle, the material 110 to be dry etched can accurately be set to almost the same size as the width W0 of the first mask 130.

The present invention is applicable to formation of a high-aspect ratio second mask 120 that has an aspect ratio of height to minimum section width within the range of 2.5 to 7.

One typical application of the method for forming a dry etching mask according to the present invention is to a method for manufacturing a magnetic head. Next will be described a specific example of a thin-film magnetic head to which the present invention is applicable.

(Structure of a Thin-Film Magnetic Head)

The magnetic head illustrated in FIGS. 9 to 12 is to be used in combination with a rapidly spinning magnetic recording medium such as a hard disk. Magnetic heads of this type are generally called "floating-type". First, referring to FIG. 9, the magnetic head has a slider substrate 1 of a generally rectangular prism structure. The slider substrate 1 has an air bearing surface 70 directly related to the floating characteristics, and a recording/reproducing head (100A, 100B) is disposed at a side end face located on the side of an air flow-out end (trailing edge) with respect to an air flow direction M.

Figure 10:
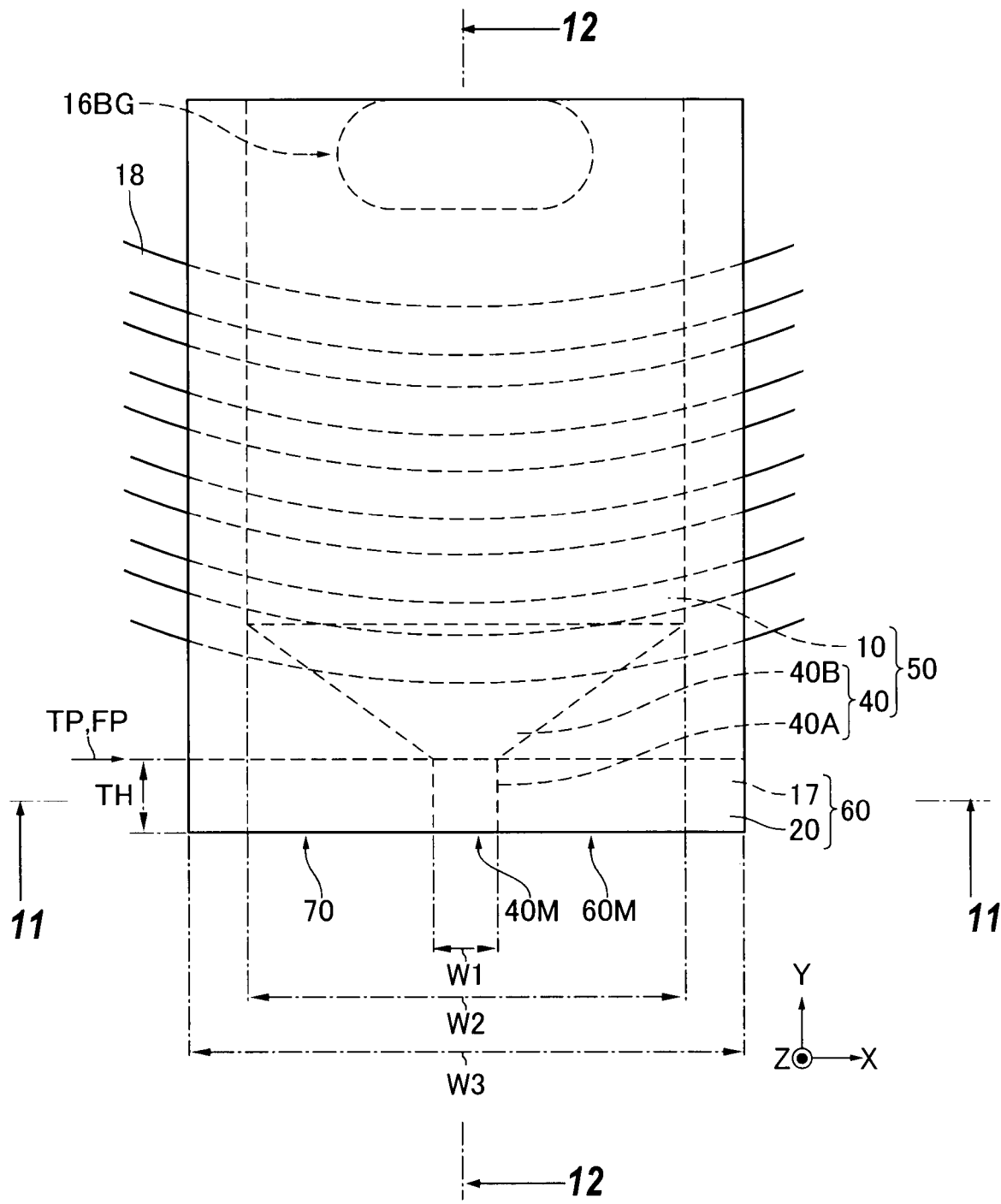
FIG. 10 is a plan view schematically showing a portion of a perpendicular recording head contained in the magnetic head shown in FIG. 9.
Figure 11:
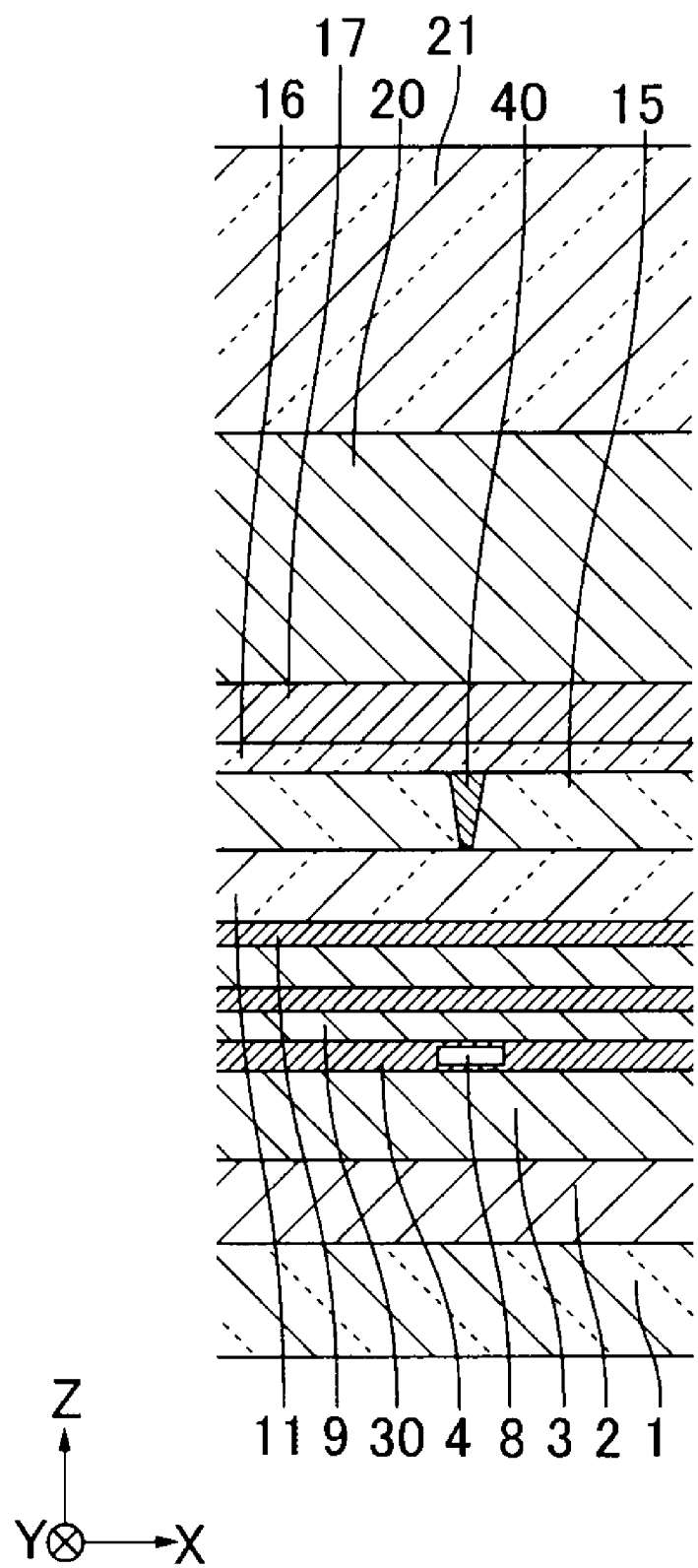
FIG. 11 is a sectional view taken along line 11-11 of FIG. 10.
Figure 12:
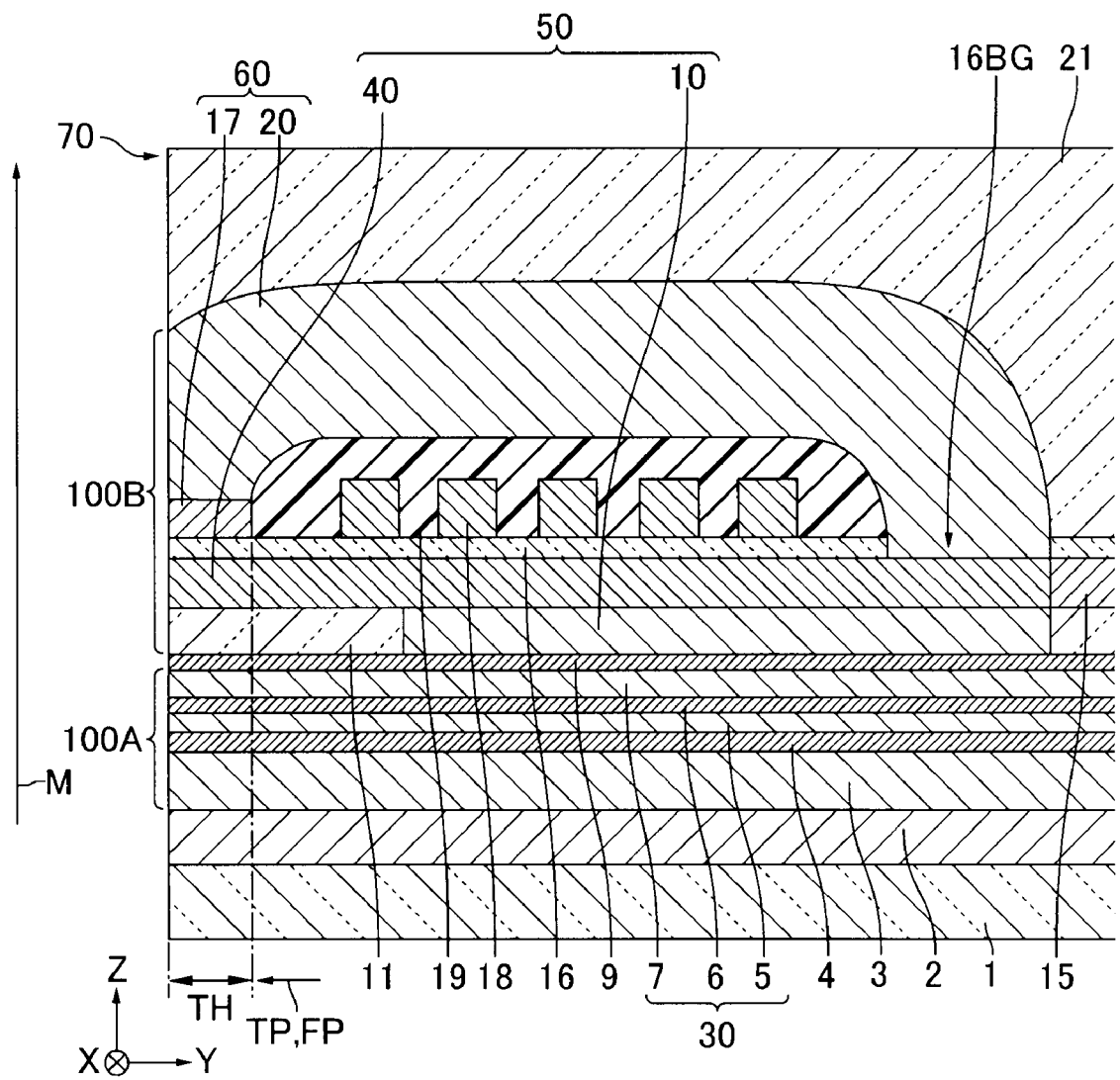
FIG. 12 is a sectional view taken along line 12-12 of FIG. 10.

Details of the recording/reproducing head (100A, 100B) are shown in FIGS. 10 to 12. In FIGS. 10 to 12, dimensions along X, Y and Z axes are called "width", "length" and "thickness/height", respectively. Along the Y axis, moreover, sides close to and remote from the air bearing surface 70 are designated by "front" and "rear", respectively, and being positioned forward and being positioned rearward are expressed by "project" and "recede", respectively.

The magnetic head shown in FIGS. 10 to 12 is a complex-type head which can perform both recording and reproducing. In the magnetic head, an insulating film 2, the reproducing head 100A using magneto-resistive effect (MR), a separating film 9, the recording head 100B for performing a recording process in a perpendicular recording method, and an overcoat film 21 are layered on the slider substrate 1 in the mentioned order.

The reproducing head 100A is formed, for example, by layering a lower read shield film 3, a shield gap film 4, and an upper read shield film 30 in the mentioned order. In the shield gap film 4, a reproducing head (or MR element 8) is embedded in such a manner as to be exposed on the air bearing surface 70. The air bearing surface 70 is uniquely defined with reference to one end face of the slider substrate 1 supporting a series of components from the insulating film 2 to the overcoat film 21, more specifically, refers to a surface containing one end face of the slider substrate 1.

Both the lower read shield film 3 and the upper read shield film 30 function to magnetically separate the MR element 8 from the surroundings and extend rearward from the air bearing surface 70. The lower read shield film 3 is made of, for example, a magnetic material such as a nickel-iron alloy (NiFe). The upper read shield film 30 is formed, for example, by layering two upper read shield film portions 5, 7 with a non-magnetic film 6 interposed therebetween. Both the upper read shield film portions 5, 7 are made of, for example, a magnetic material such as a nickel-iron alloy. The non-magnetic film 6 is made of, for example, a non-magnetic material such as ruthenium (Ru) or alumina.

The shield gap film 4 functions to electrically separate the MR element 8 from the surroundings and is made of, for example, a non-magnetic insulating material such as alumina. The MR element 8 uses giant magneto-resistive effect (GMR) or tunneling magneto-resistive effect (TMR), for example.

The recording head 100B is a so-called shield-type perpendicular recording head including a non-magnetic film 11, a first non-magnetic film 15, a magnetic pole film 50, a gap film 16 with an opening (or back gap 16BG) for magnetic connection, a coil film 18 embedded in an insulating film 19, and a magnetic film 60.

The magnetic pole film 50 extends rearward from the air bearing surface 70 and includes an auxiliary magnetic pole film 10 and a main magnetic pole film 40.

The auxiliary magnetic pole film 10 extends from behind the air bearing surface 70 to the back gap 16BG. For example, the auxiliary magnetic pole film 10 is disposed on the leading side with respect to the main magnetic pole film 40 and has a rectangular plan shape (width W2), as shown in FIG. 10. The non-magnetic film 11 functions to electrically and magnetically separate the auxiliary magnetic pole film 10 from the surroundings and is made of, for example, a non-magnetic insulating material such as alumina. However, it is also possible to dispose the auxiliary magnetic pole film 10 on the trailing side of the main magnetic pole film 40.

The first non-magnetic film 15 functions to electrically and magnetically separate the main magnetic pole film 40 from the surroundings and is made of, for example, a non-magnetic insulating material such as alumina.

The main magnetic pole film 40 extends from the air bearing surface 70 to the back gap 16BG. The main magnetic pole film 40 is disposed inside the first non-magnetic film 15.

The main magnetic pole film 40 includes, for example, the small width portion 40A extending rearward from the air bearing surface 70 and a large width portion 40B connected to the rear of the small width portion 40A, as shown in FIG. 10.

The small width portion 40A is a substantial magnetic flux emitting portion (so-called magnetic pole film) and has a constant width W1 which defines the recording track width. The large width portion 40B is a portion intended to supply a magnetic flux to the small width portion 40A and has a width W2 larger than the width W1. The width of the large width portion 40B decreases in its front portion toward the small width portion 40A. The position where the width of the main magnetic pole film 40 starts to increase from the width W1 to the width W2 is a so-called flare point FP.

An end face 40M of the main magnetic pole film 40 on the side close to the air bearing surface 70 is of an inverted trapezoidal shape, whose upper bottom and lower bottom are the longer side on the trailing side and the shorter side on the leading side, respectively. The upper end edge of the trapezoidal shape is a substantial recording portion, and its width W1 is approximately 0.2 μm or less.

The gap film 16 is a gap for magnetically separating the magnetic pole film 50 and the magnetic film 60 and is made of, for example, a non-magnetic insulating material such as alumina or a non-magnetic conductive material such as ruthenium. The thickness of the gap film 16 is approximately 0.03 to 0.1 μm.

The coil film 18 functions to generate a magnetic flux and is made of, for example, a highly conductive material such as copper (Cu). The coil film 18 is wound around the back gap 16BG to have a winding structure (or spiral structure), as shown in FIG. 10.

The insulating film 19 functions to electrically separate the coil film 18 from the surroundings and is made of, for example, a non-magnetic insulating material such as a photoresist or a spin on glass (SOG) which becomes liquid when heated. The forefront position of the insulating film 19 is a throat height zero position TP, and the distance between the throat height zero position TP and the air bearing surface 70 is a so-called "throat height TH". FIG. 10 shows a case where the throat height zero position TP matches the flare point FP.

The magnetic film 60 functions to absorb a spreading component of a magnetic flux emitted from the magnetic pole film 50 so as to increase the gradient of the perpendicular magnetic field and also absorb a magnetic flux returning from a recording medium so as to circulate the magnetic flux between the recording head 100B and a recording medium. The magnetic film 60, which extends rearward from the air bearing surface 70 on the trailing side of the magnetic pole film 50, is separated from the magnetic pole film 50 by the gap film 16 at its front but connected to the magnetic pole film 50 through the back gap 16BG at its rear. An end face 60M of the magnetic film 60 on the side close to the air bearing surface 70 is, for example, of a rectangular shape having a width W3 larger than the width W1, as shown in FIG. 10. The magnetic film 60 includes, for example, a write shield film 17 and a return yoke film 20 which are distinct from each other.

The write shield film 17 functions to mainly increase the gradient of the perpendicular magnetic field and is made of, for example, a high saturation magnetic flux density magnetic material such as a nickel-iron alloy or an iron-based alloy. Particularly by absorbing a spreading component of a magnetic flux emitted from the magnetic pole film 50, the write shield film 17 functions to: increase the magnetic field gradient of the perpendicular magnetic field; decrease the recording width; and incorporate an oblique magnetic field component into the perpendicular magnetic field. However, the write shield film 17 may additionally function to circulate the magnetic flux like the return yoke film 20. The write shield film 17 is adjacent to the gap film 16 and extends rearward from the air bearing surface 70 to have its rear end adjacent to the insulating film 19. Thus, the write shield film 17 serves to define the forefront position (throat height zero position TP) of the insulating film 19.

The return yoke film 20 functions to circulate the magnetic flux and is made of, for example, a magnetic material similar to that of the write shield film 17. The return yoke film 20 extends from the air bearing surface 70, through above the insulating film 19, to the back gap 16BG on the trailing side of the write shield film 17 and is connected to the write shield film 17 at its front but to the magnetic pole film 50 at its rear through the back gap 16BG, as shown in FIG. 12.

The overcoat film 21 functions to protect the magnetic head and is made of, for example, a non-magnetic insulating material such as alumina.

(Method for Manufacturing a Thin-Film Magnetic Head)

In the thin-film magnetic head described above, the present invention is applicable to production of the main magnetic pole film 40 that is a main component of the perpendicular recording head 100B. The processes before the production process of the perpendicular recording head have been known heretofore and do not require specific description. Roughly speaking, it can be manufactured by layering a series of components in order by using a conventional thin-film process including a film formation technique such as plating or sputtering, a patterning technique such as photolithography, an etching technique such as dry etching or wet etching, and a polishing technique such as CMP (chemical mechanical polishing).

Roughly speaking the thin-film process with reference to FIGS. 10 to 12, when manufacturing the magnetic head, at first, the insulating film 2 is formed on the slider substrate 1, and then the lower read shield film 3, the shield gap film 4 embedded with the MR element 8, and the upper read shield film 30 (the upper read shield film portions 5, 7 and the non-magnetic film 6) are layered on the insulating film 2 in the mentioned order, thereby forming the reproducing head 100A.

Then, after the separating film 9 is formed on the reproducing head 100A, the magnetic pole film 50 (the auxiliary magnetic pole film 10 and the main magnetic pole film 40) enclosed with the non-magnetic films 11, 15, the gap film 16, the coil film 18 insulated by the insulating film 19, and the magnetic film 60 (the write shield film 17 and the return yoke film 20) are layered on the separating film 9 in the mentioned order, thereby forming the recording head 100B. Finally, after the overcoat film 21 is formed on the recording head 100B, the air bearing surface 70 is formed by using a machining process or a polishing process, thereby completing the magnetic head.

(Application of the Invention)

Figure 13:
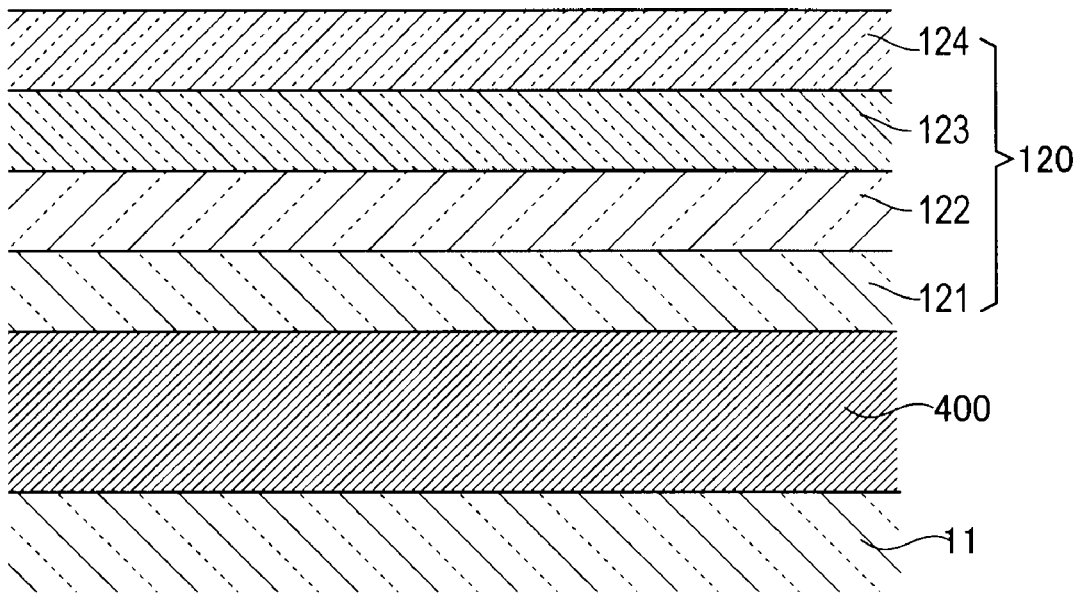
FIG. 13 is a diagram showing an example of a step where the dry etching mask forming method according to the present invention is applied to formation of a main magnetic pole.

In the production process described above, the method for forming a dry etching mask according to the present invention is applicable to the process of forming the main magnetic pole film 40. Most of the process has already been described with reference to FIGS. 1 to 7. At first, after a main magnetic pole layer 400, which is a material to be dry etched, is formed on a non-magnetic film 11 such as by adopting a plating process, a plurality "n" of aluminum oxide films 121 to 124 are sequentially sputtered on the main magnetic pole layer 400 in such a manner that etching rate ER1 to ER4 with respect to RIE increases toward a lower layer, as shown in FIG. 13. More specifically, the film formation is performed to satisfy ER1>ER2>ER3>ER4.

The sputtering film formation of the plurality of aluminum oxide films 121 to 124 with different etching rates with respect to RIE can be achieved by controlling bias voltage upon the sputtering film formation.

Figure 14:
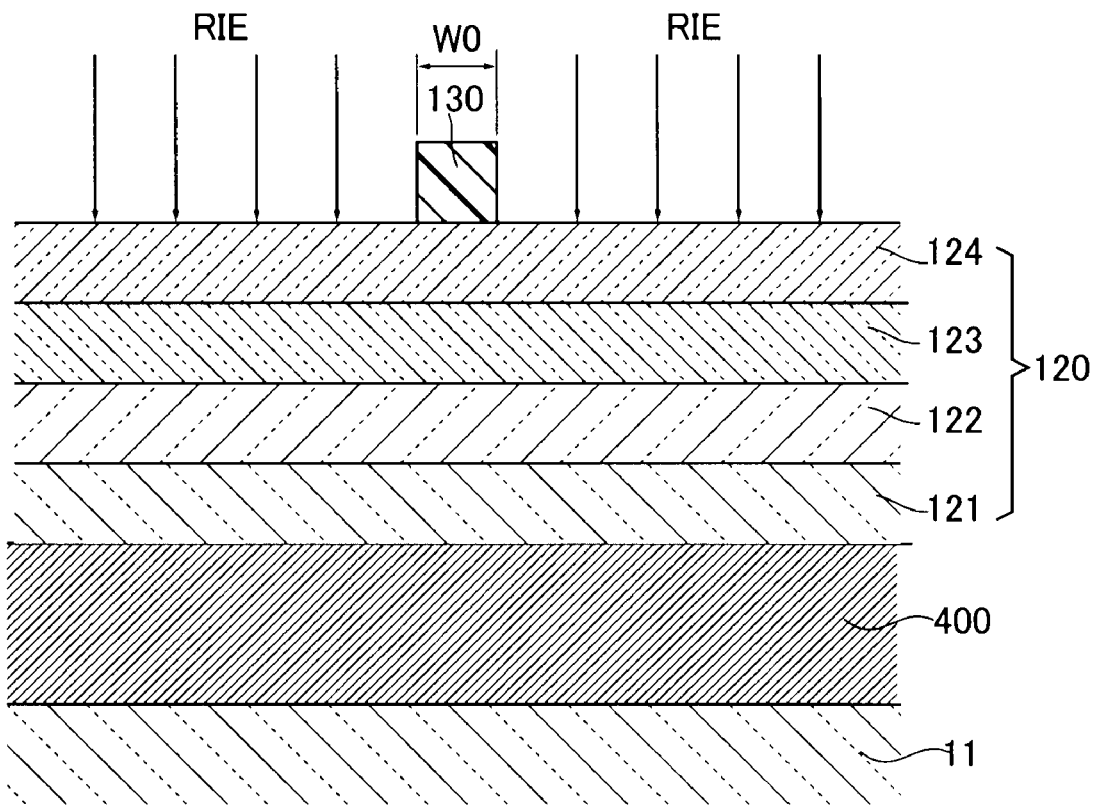
FIG. 14 is a diagram showing a step after the step shown in FIG. 13.

After the aluminum oxide films 121 to 124 are formed as described above, a first mask 130 that has etching resistance with respect to RIE is formed on the laminated film of the aluminum oxide films 121 to 124, as shown in FIG. 14. The first mask 130 is formed to have a width W0 in conformity with the track width W1 (see FIG. 10) required for the main magnetic pole layer 400.

Figure 15:
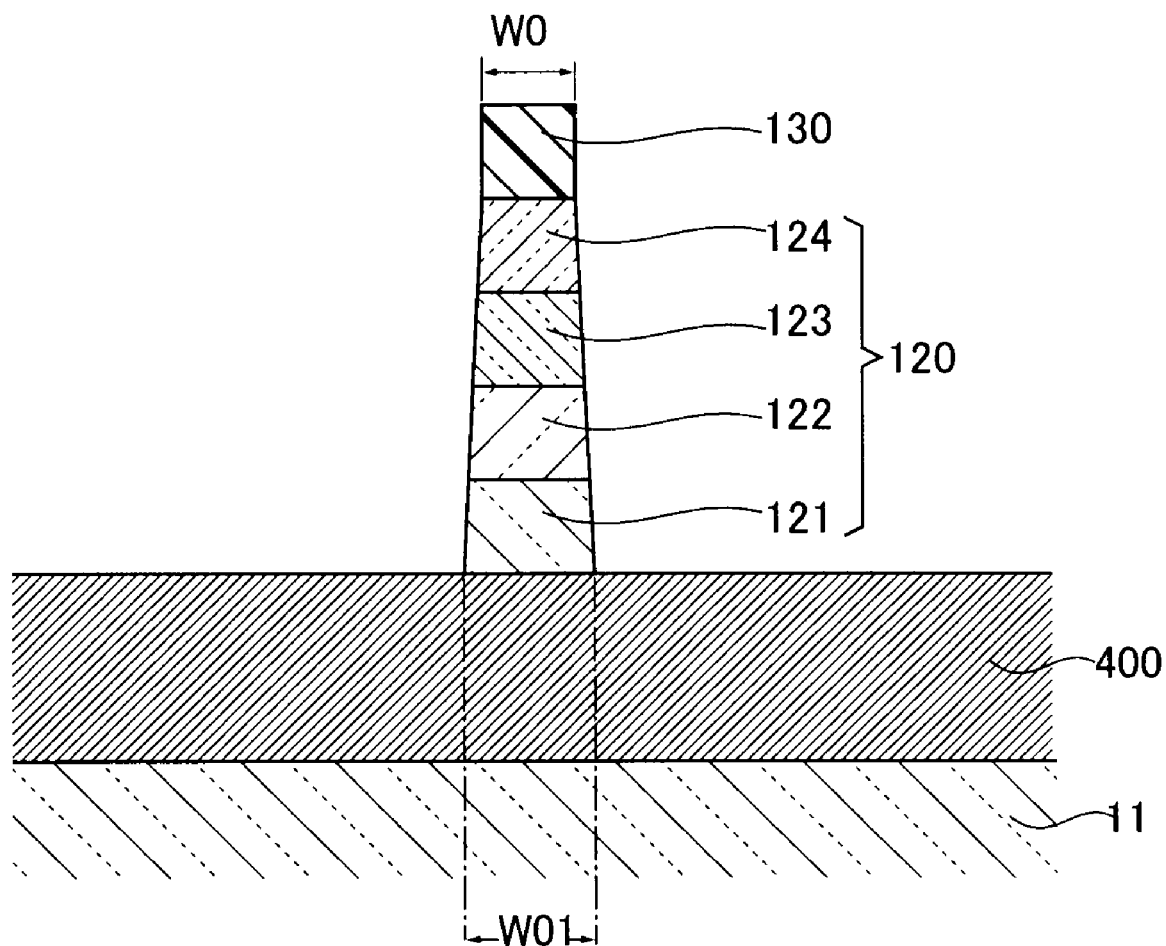
FIG. 15 is a diagram showing a step after the step shown in FIG. 14.

Subsequently, RIE is performed from above the first mask 130 to form a second mask 120 out of the laminate film of the aluminum oxide films 121 to 124, as shown in FIG. 15.

The laminated film 120, on which the first mask 130 is formed, is etched by RIE, thereby finally forming the second mask 120. When RIE is performed on the laminated film 120 from above the first mask 130, the etching rate increases toward a lower layer of the aluminum oxide films 121 to 124 during a single RIE process. Therefore, the width W01 (<W02) of the second mask 120 at its bottom side in contact with the material 110 to be dry etched comes close to the width W0 at its top side in contact with the first mask 130, whereby the side walls at both sides of the bottom side rise almost perpendicularly from the bottom side.

Figure 16:
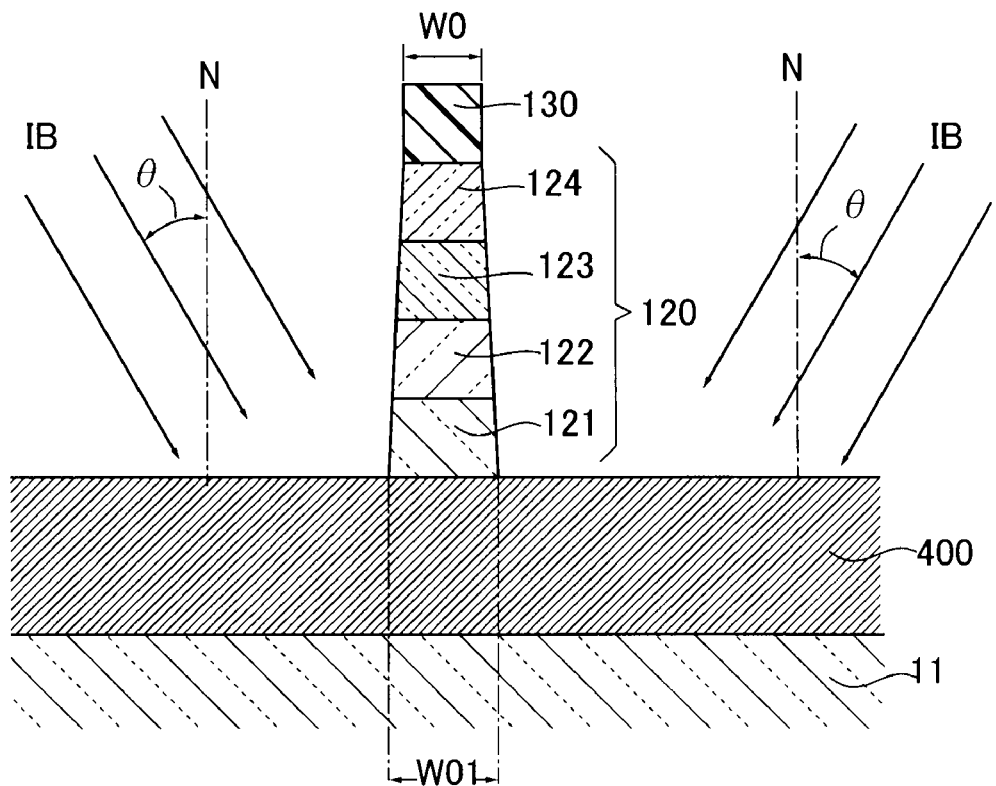
FIG. 16 is a diagram showing a step after the step shown in FIG. 15.
Figure 17:
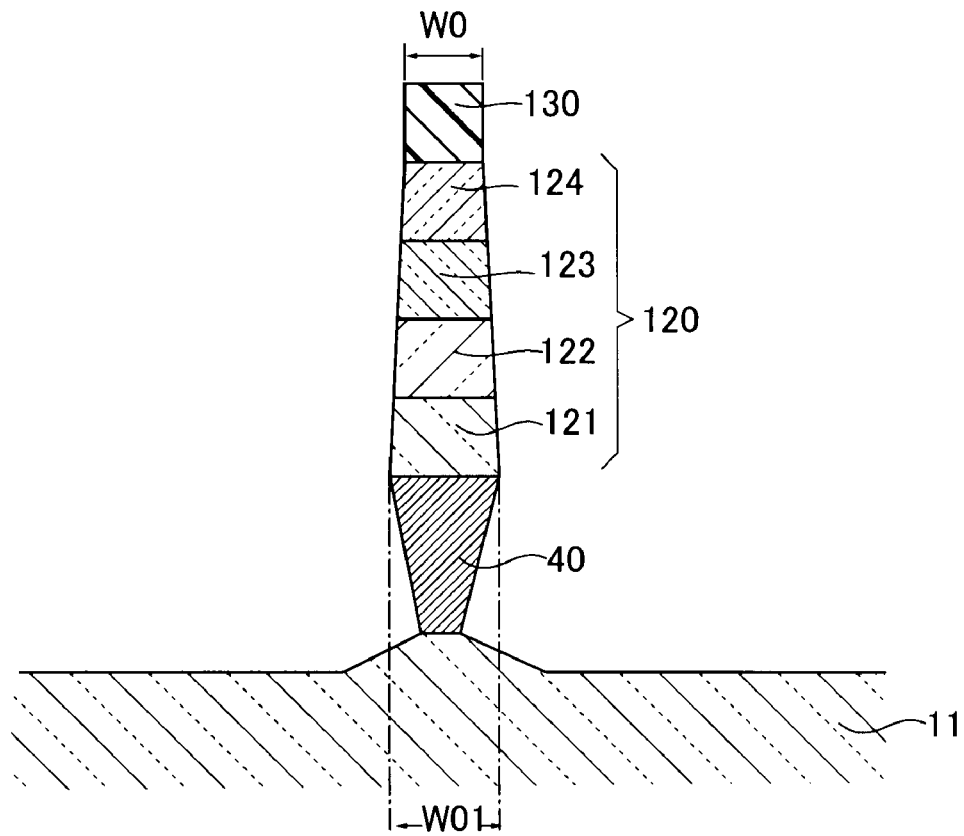
FIG. 17 is a diagram showing a step after the step shown in FIG. 16.

Subsequently, as shown in FIG. 16, ion milling using ion beams IB is performed on the main magnetic pole layer 400 from above the second mask 120. When performing ion milling, it is preferable to emit the ion beams IB at an angle θ of 30 to 35 degrees with respect to the normal N to the surface of the main magnetic pole layer 400. Thus, the main magnetic pole film 40 of an inverted trapezoidal shape can be formed beneath the second mask 120, as shown in FIG. 17. It should be noted that although FIG. 17 shows only the small width portion 40A, which is selected from the large width portion 40B and the small width portion 40A of the main magnetic pole film 40 because of its important for magnetic recording, the large width portion 40B is simultaneously dry etched by the ion beams IB.

Figure 18:
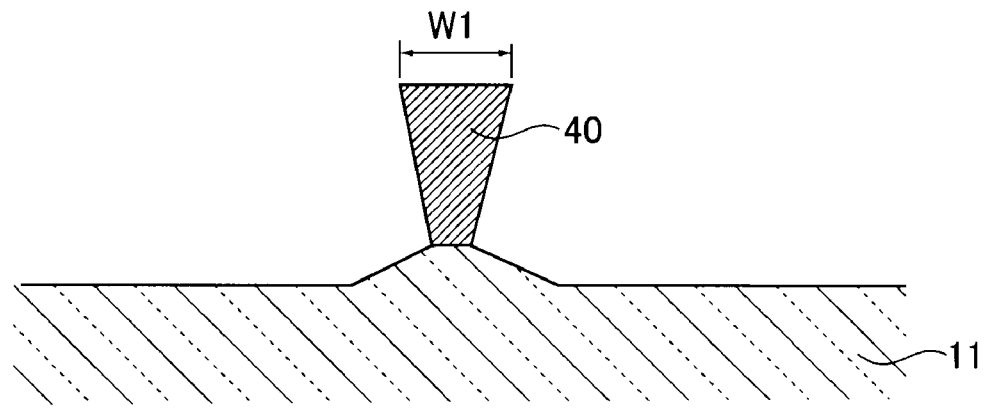
FIG. 18 is a diagram showing a step after the step shown in FIG. 17.
Figure 19:
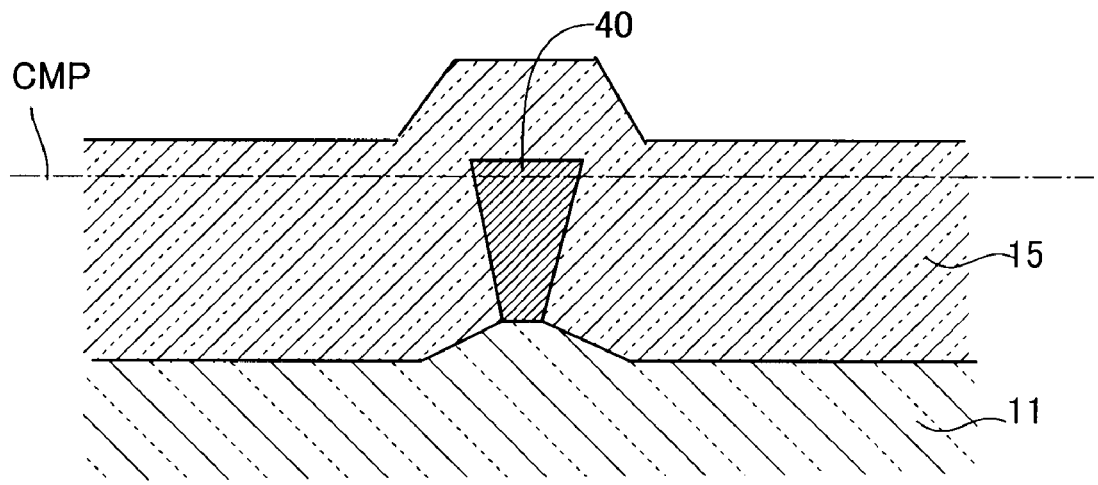
FIG. 19 is a diagram showing a step after the step shown in FIG. 18.
Figure 20:
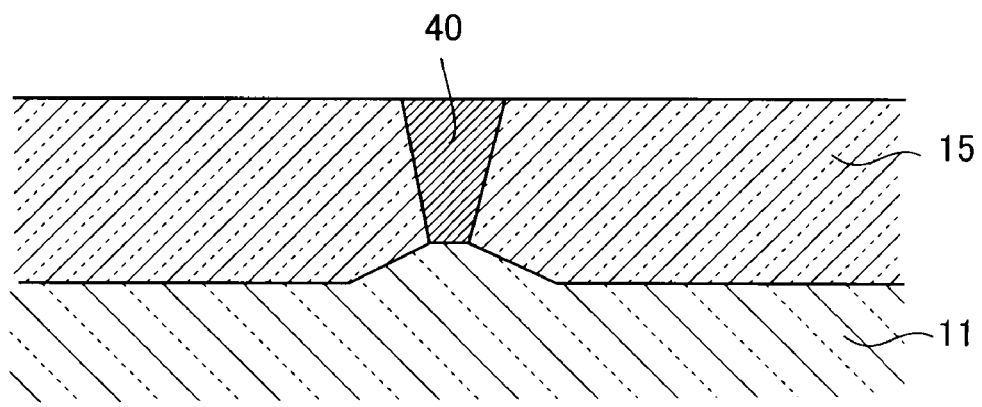
FIG. 20 is a diagram showing a step after the step shown in FIG. 19.

Then, after removal of the second mask 120, as shown in FIG. 18, an insulating film 15 is formed such as by sputtering, as shown in FIG. 19, thereby covering the main magnetic pole film 40 with the insulating film 15. Thereafter, the surface of the insulating film 15 and the main magnetic pole film 40 is flattened by CMP (chemical mechanical polishing), as shown in FIG. 20. After this, necessary post-processes are performed to obtain the intended thin-film magnetic head.

In the RIE process described above, since the rising angle of the lateral sides at both sides of the bottom side of the second mask 120 approaches a right angle, the bottom width W01 of the second mask 120 can be accurately set to almost the same size as the width W0 of the first mask 130, thereby establishing the width W1 of the small width portion 40A of the main magnetic pole film 40, so that the width W1 of the small width portion 40A can be accurately set to almost the same size as the width W0 of the first mask 130.

The present invention has been described in detail above with reference to preferred embodiments. However, obviously those skilled in the art could easily devise various modifications of the invention based on the technical concepts underlying the invention and teachings disclosed herein.

What is claimed is:

1. A method for forming a dry etching mask, comprising:
sequentially forming a plurality of aluminum oxide films on a material to be dry etched such that a laminated film comprising the aluminum oxide films is formed to increase an etching rate with respect to reactive ion etching toward a lower layer of the aluminum oxide films;
   forming, on the laminated film of said plurality of aluminum oxide films, a first mask that has etching resistance with respect to said reactive ion etching; and
   applying reactive ion etching upon the laminated film with said first mask such that the laminated film is formed into a second mask,
   wherein the second mask has a bottom width in contact with the material which comes close to a top width in contact with the first mask, and the second mask has side walls which rise substantially perpendicular with respect to a surface of the material from a bottom side of the second mask, the plurality of aluminum oxide films provides different etching rates in respective layers of the aluminum oxide films, and the aluminum oxide films are formed by sputtering in which a bias voltage is set within a range of from 20 to 180 V for each of the aluminum oxide films, and the bias voltage is varied by 80V between adjacent films of the aluminum oxide films.

2. The method as claimed in claim 1, wherein the aluminum oxide films are formed by controlling the bias voltage for each of the aluminum oxide films in a stepwise fashion with a voltage-controlled RF power.

3. The method as claimed in claim 1, wherein said second mask has an aspect ratio of height to minimum section width within a range of 2.5 to 7.

4. The method as claimed in claim 1, wherein the aluminum oxide films are formed by increasing the bias voltage from an upper layer of the aluminum oxide films toward a lower of the aluminum oxide films.

5. The method as claimed in claim 1, wherein the bias voltage is varied such that the plurality of aluminum oxide films provides different etching rates in respective layers of the aluminum oxide films within a range of from about 74 to 88.5 nm/min.

6. The method as claimed in claim 1, wherein the aluminum oxide films are each formed to have a thickness within a range of from 150 to 250 nm.

7. A method for manufacturing a magnetic head with a main magnetic pole film for perpendicular writing, comprising: sequentially forming a plurality of aluminum oxide films on a ferromagnetic film for a main magnetic pole film such that a laminated film comprising the aluminum oxide films is formed to increase an etching rate with respect to reactive ion etching toward a lower layer of the aluminum oxide films;
  forming, on the laminated film of said plurality of aluminum oxide films, a first mask that has etching resistance with respect to said reactive ion etching;
  applying reactive ion etching upon the laminated film with said first mask such that the laminated film is formed into a second mask; and
  applying dry etching upon said ferromagnetic film with said second mask,
  wherein the second mask has a bottom width in contact with the material which comes close to a top width in contact with the first mask, and the second mask has side walls which rise substantially perpendicular with respect to a surface of the material from a bottom side of the second mask, the plurality of aluminum oxide films provides different etching rates in respective layers of the aluminum oxide films, the aluminum oxide films are formed by sputtering in which a bias voltage is set within a range of from 20 to 180 V for each of the aluminum oxide films, and the bias voltage is varied by 80V between adjacent films of the aluminum oxide films.

8. The method as claimed in claim 7, wherein the aluminum oxide films are formed by controlling the bias voltage for each of the aluminum oxide films in a stepwise fashion with a voltage-controlled RF power.

9. The method as claimed in claim 7, wherein said second mask has an aspect ratio of height to minimum section width within a range of 2.5 to 7.

10. The method as claimed in claim 7, further comprising forming the ferromagnetic film.

11. The method as claimed in claim 7, wherein the aluminum oxide films are formed by increasing the bias voltage from an upper layer of the aluminum oxide films toward a lower of the aluminum oxide films.

12. The method as claimed in claim 7, wherein the bias voltage is varied such that the plurality of aluminum oxide films provides different etching rates in respective layers of the aluminum oxide films within a range of from about 74 to 88.5 nm/min.

13. The method as claimed in claim 7, wherein the aluminum oxide films are each formed to have a thickness within a range of from 150 to 250 nm.

\* \* \* \* \*

UNITED STATES PATENT AND TRADEMARK OFFICE
CERTIFICATE OF CORRECTION

| | | |
|---|---|---|
| PATENT NO. | : 8,303,780 B2 | Page 1 of 1 |
| APPLICATION NO. | : 12/241667 | |
| DATED | : November 6, 2012 | |
| INVENTOR(S) | : Kento Edakawa et al. | |

It is certified that error appears in the above-identified patent and that said Letters Patent is hereby corrected as shown below:

On the title page, Item (12), the inventor's last name is incorrect. Item (12) should read:

-- (12)  United States Patent
         Edakawa et al. --

On the title page, Item (75), the first Inventor's last name is incorrect. Item (75) should read:

-- (75) Inventors:  Kento Edakawa, Tokyo (JP); Hiromichi Umehara, Tokyo (JP); Noriaki Kasahara, Tokyo (JP); Michitaka Nishiyama, Tokyo (JP) --

Signed and Sealed this
Nineteenth Day of February, 2013

Teresa Stanek Rea
*Acting Director of the United States Patent and Trademark Office*